(12) United States Patent
Hsieh et al.

(10) Patent No.: US 7,975,095 B2
(45) Date of Patent: Jul. 5, 2011

(54) DEVICE AND METHOD FOR USING A FLASH MEMORY AS A HARD DISK CACHE

(75) Inventors: Jen-Wei Hsieh, Taipei (TW); Po-Liang Wu, Taipei (TW); Yuan-Hao Chang, Tainan (TW); Tei-Wei Kuo, Taipei (TW); Cheng-Chih Yang, Taipei (TW)

(73) Assignee: Genesys Logic, Inc., Taipei (TW)

( * ) Notice: Subject to any disclaimer, the term of this patent is extended or adjusted under 35 U.S.C. 154(b) by 836 days.

(21) Appl. No.: 11/963,173

(22) Filed: Dec. 21, 2007

(65) Prior Publication Data
US 2008/0162795 A1  Jul. 3, 2008

(51) Int. Cl.
*G06F 12/00* (2006.01)
(52) U.S. Cl. ........ 711/103; 711/100; 711/154; 711/170; 365/185.33
(58) Field of Classification Search .................. 711/100, 711/103, 154, 170; 365/185.33
See application file for complete search history.

(56) References Cited

U.S. PATENT DOCUMENTS

| | | | | |
|---|---|---|---|---|
| 4,654,819 A | * | 3/1987 | Stiffler et al. ................. | 711/162 |
| 7,356,641 B2 | * | 4/2008 | Venkiteswaran ............. | 711/103 |
| 7,480,761 B2 | * | 1/2009 | Birrell et al. .................. | 711/103 |
| 2005/0246487 A1 | * | 11/2005 | Ergan et al. .................... | 711/113 |
| 2007/0118688 A1 | * | 5/2007 | Lee et al. ...................... | 711/113 |

FOREIGN PATENT DOCUMENTS

CN         1801121         7/2006

* cited by examiner

*Primary Examiner* — Sanjiv Shah
*Assistant Examiner* — Arpan P. Savla
(74) *Attorney, Agent, or Firm* — Kirton & McConkie; Evan R. Witt

(57) ABSTRACT

A cache device comprises a hard disk, cache control unit and at least one flash memory, whereby the cache control unit controlling and regulating the flash memory as the hard disk cache device. The present invention method is defined by setting up a management table to manage each corresponding logical block address of the flash memory through a cache data read-out step and cache data write-in step in order to manage the cache read or write action of the flash memory on the hard disk. In addition, the step of recycling a cache space and replacing cache temporary data storage is to remove and replace temporary cache and storage space within the flash memory on the hard disk. Moreover, the step of reconstruction management table is provided to reconstruct management table loss or damage caused by power outage or irregular shut-down of the computer and will be able to provide flash memory on the hard disk cache control.

6 Claims, 9 Drawing Sheets

DEVICE AND METHOD FOR USING A FLASH MEMORY AS A HARD DISK CACHE

BACKGROUND OF THE INVENTION

1. Field of the Invention

The present invention relates to a hard disk cache device and method, and more particularly, relates to a hard disk data read/write using at least one flash memory as a hard disk cache buffering device and method thereof.

2. Description of the Related Art

Accordingly, in prior art, hard disks are widely used for data read/write and as storage devices in mainframe computers or consumer electronic products, such as desktop computers, laptop computers, industrial computers, playback-featured DVD players, and other electronic products. However, considering hard disks consume a great deal of power usage, utilizing flash memory as a hard disk cache to perform major data read/write reduces power consumption and therefore achieves the purpose of energy saving. The technologies as reflected in the article "Flash Memory File Caching for Mobile Computers" which appeared in "Proceedings of the 27$^{th}$ Annual Hawaii International Conference on System Sciences" by B. Marsh, F. Douglis, P. Krishnan, et. al., and Microsoft Corporation publication of "Hybrid Hard Drives with Non-Volatile Flash and Longhorn" and prior art cache management mechanism are noticed. In addition, another publication of "Computer Architecture: A Quantitative Approach", published in 1996 by John L. Hennessy and David A. Patterson of Morgan Kaufmann Publishing company, noticed that direct mapping or method of "Set Associative" cache, is great for consideration within Academia, but not applicable for using flash memory as a hard disk cache.

In consideration of flash memory as a hard disk cache in prior art, the logical address space corresponding to the flash memory is much greater than the physical address space of the flash memory. Therefore, the prior art flash memory storage system technologies and management mechanisms, e.g. Aleph One's YAFFS (Yet Another Flash Filing System) technology or M-Systems' NFTL (Flash-memory Translation Layer for NAND flash) technology are not applicable. In addition, these prior art flash memory cache system technologies and management mechanisms lack a data replacement mechanism in cache, so that it cannot be directly used as a hard disk cache management mechanism.

As noted above, in the year 1994, Marsh et. al., used flash memory as a hard disk cache in order to achieve the purpose of saving energy; however, they used in the original experiment a small storage capacity of a 40 MB hard disk, in addition to a 20 MB NOR-type gate flash memory from old computer components, which then is unsuitable to the current GB (giga-byte)-sized large storage capacity of hard disk or large storage capacity of NAND-type flash memory devices. In addition, in the technology published by Marsh et. al., "Flash Memory File Caching for Mobile Computers," it does not mention how to effectively identify and locate the required data in the flash memory cache. The technique of identifying and locating the cached data effectively is not a problem when the flash memory capacity is small; however, when the flash memory capacity is in the tens and hundreds of gigabytes, effectively identifying and locating cache can be very important. The prior art of Marsh et. al., is not demonstrating the use of this.

Since 2003, Microsoft and Samsung began cooperating in the prototype technology of developing flash memory as a hard disk cache, that is, flash memory and hard disk to form a mix-component hybrid hard disk, called a hybrid hard drive. However, the hybrid hard drive prototype flash memory is used for write-only and as temporary boot data storage; as for reading data, it does not require a cache process. The hybrid hard drive only manages the data write cache, and the data read cache is managed by a new generation of Microsoft operating system software. The drawback occurs when used with non-Microsoft operating systems computer mainframe or electronic products, such as UNIX operating system or the mainframe computer using Linux operating system or other industrial computers and DVD player recorders, that it is unable to use the technology. This type of data separation to read or write cache management of prior art is effecting the efficiency and speed of hard disks, and inevitably affecting the frequent access of cache.

SUMMARY OF THE INVENTION

The first objective of the present invention is to provide a hard disk cache device, in particular, a hard disk cache which enables the hard disk and flash memory to directly have the cache data read/write used in industries.

The second objective of the present invention is to provide a hard disk cache device, which can be directly applied to large storage capacity hard disks and large capacity NAND flash memories for data buffer and control mechanism.

In order to achieve the above-mentioned objectives, the present invention device comprises a hard disk, a cache control unit and at least one flash memory. The cache control unit is coupled to the hard disk and the flash memory for controlling and configuring the flash memory as the hard disk cache data read/write device in order to achieve the most efficient and effective hard disk cache.

The third objective of the present invention is to provide a method for a hard disk cache, so that the cache movement of the hard disk and flash memory are consistent to facilitate industrial needs and use.

The fourth objective of the present invention is to provide a method for a hard disk cache. The method comprises away to recycle, remove, and rapidly replace the cache space of the hard disk cache; therefore, allowing the flash memory of the cache data read/write efficiency to be upgraded.

The fifth objective of the present invention is to provide a method for a hard disk cache, in particular, enable flash memory unaffected by applicable hosts or consumer electronic products receiving irregular shutdown or power failure; rather, able to have a reconstruction function of a hard disk cache directly.

The sixth objective of the present invention is to provide a method for a hard disk cache, which is not limited by operating systems of applicable mainframe computers or consumer electronic products in industrial use.

To achieve the above-mentioned objectives of the present invention methods, defining and setting-up a management table to manage each corresponding logical block address of the flash memory through a cache data read-out step and cache data write-in step in order to manage the cache read or write action of the flash memory on the hard disk. In addition, utilizing the reclamation step of a cache space and replacing cache temporary data storage to remove and replace temporary cache and storage space within the flash memory on the hard disk. Moreover, the step of reconstruction management table is to prevent the loss or damage of management table caused by power outage or irregular shut-down of the computer leading to reconstructing management table to provide flash memory on the hard disk cache control ability, thereby achieving the present invention hard disk cache for industrial use, and achieving cache data management, space reclamation and removal, replacement and reconstruction more effective.

The present invention will be described with additional details of various embodiments and reference to the accompanying drawings. Other features, objectives and advantages will become more apparent from the description and drawings, and from the claims.

DETAILED DESCRIPTION OF THE INVENTION

Figure 1:
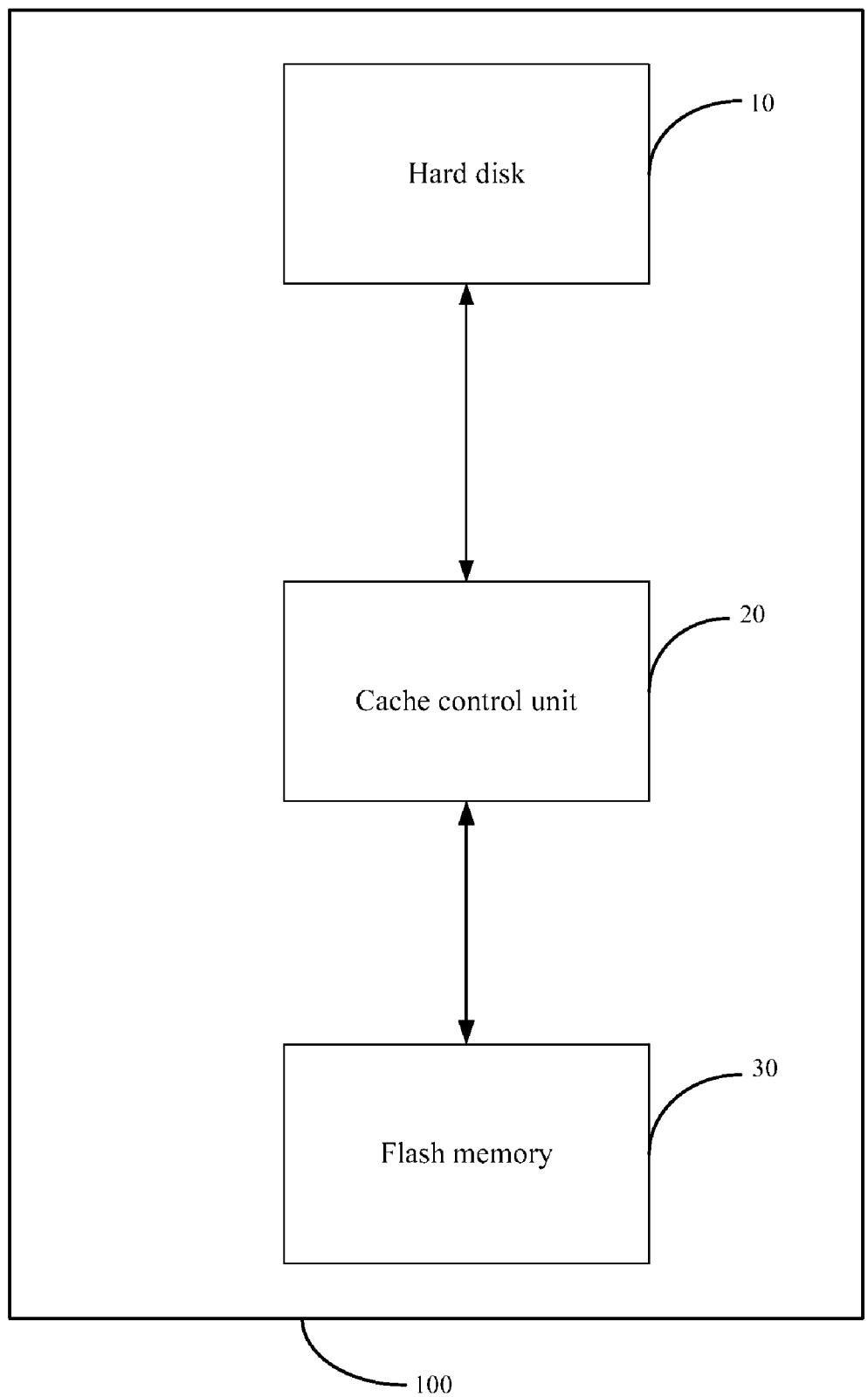
FIG. 1 illustrates a circuit block diagram of a hard disk cache device according to the present invention.

Please refer to FIG. 1, an illustration of the present invention hard disk cache device 100, comprises a hard disk 10 coupled to a host device 200 (not shown). The host device 200 is not limited to a computer mainframe device, such that other devices like laptops, industrial computers or DVD playback players are within the scope of the present invention.

A cache control unit 20 is coupled to the hard disk 10 for controlling hard disk 10 cache and temporary storage. At least one flash memory 30 is coupled to the cache control unit 20 for providing temporary storage of the hard disk 10 cache; the flash memory 30 is controlled by the cache control unit 20 and through cache control unit 20 to temporarily store hard disk 10 cache data read/write for hard disk 10 to rapidly provide cache data output at the next cache data read/write.

Figure 2:
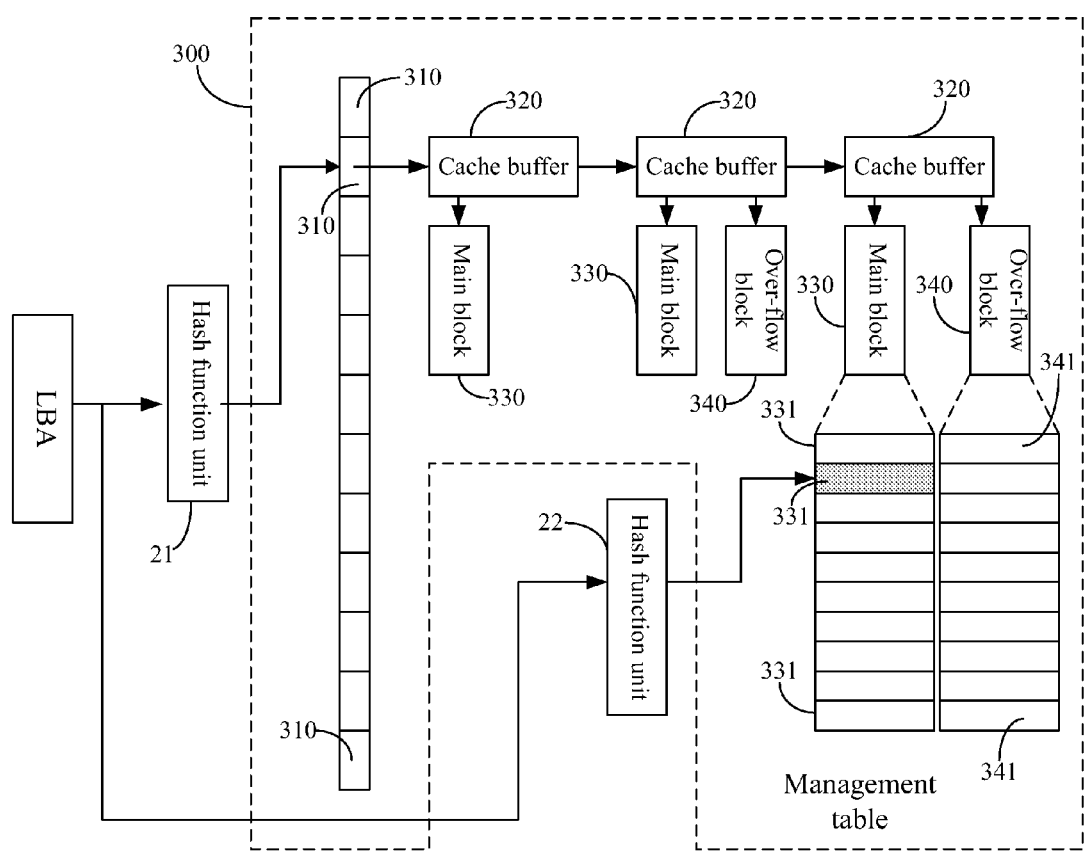
FIG. 2 illustrates a management table planning structure of hard disk cache method according to the present invention.

Please refer to FIG. 2, a management table 300 for managing and establishing relationship of physical block addresses (PBA) of the flash memory 30 and logical block addresses (LBA) of the hard disk 10 as cache data read/write requirement for accessing flash memory 30 is illustrated. The cache control unit 20 comprises a first hash function unit 21 and a second hash function unit 22; the first hash function unit 21 and the second hash function unit 22 comprise a function for computing relationship between the physical block addresses of flash memory 30 and the logical block addresses of hard disk 10.

The management table 300 comprises a plurality of storage sectors 310, a plurality of cache buffers 320, a plurality of main blocks 330, and a plurality of overflow blocks 340. Each logic block address (LBA) will correspond to a storage sector 310 of management table 300 after passing through the first hash function unit 21 for computation. Moreover, each logic block address (LBA) after passing through the first hash function unit 21 computation will correspond to a link of cache buffers 320. If data of the LBA is cached, it would reside in one of the cache buffers 320. The data may reside in a physical flash-memory page 331 of a main block 330 or in a physical flash-memory page 331 of an overflow block 340. Each storage sector 310 links a group of cache buffers 320, and each cache buffer 320 is responsible for a range of logic block addresses (LBAs). Cache data whose corresponding LBA is between the range of the LBAs of the cache buffer 320 will be placed in either the main block 330 or the overflow block 340 of that cache buffer 320.

The hard disk 10 will verify if the cache buffer 320 corresponding to logical block address exists before writing data into cache. If the cache buffer 320 exists, then will write data directly to corresponding cache buffer 320; otherwise, will configure a new cache buffer 320 to store the newly written cache data. In this manner, the number of cache buffers 320 linked to storage sector 310 will vary according to the actual situation of accessing cache data read/write to the hard disk 10, so that the access of hard disk 10 cache is more flexible.

Each cache buffer 320 is coupled to a main block 330, where each main block 330 comprises a plurality of physical flash-memory pages 331. The access to the main block 330 is based on the LBA of the hard disk 10, and the main block 330 comprises specific flash-memory pages 331 to store the cache.

Since the range of LBAs managed by each cache buffer 320 is greater than the scope that main block 330 could accommodate, collision (overlap) situation will occur when storing cache. If cache buffer 320 has not yet configured an overflow block 340 when collision (overlap) occurrences happen, then cache control unit 20 will configure an overflow block 340 in the cache buffer 320, and each overflow block 340 comprises a plurality of physical flash-memory pages 341 to temporarily store colliding cache data. Every time collision occurs, each colliding cache data will be written into the first unwritten physical flash-memory page 341 of overflow block 340.

The management table 300 is planned when flash memory 30 is formatted, and such management table 300 is formatted and planned via software program. The number of main blocks 330 and overflow blocks 340 are configured by the cache control unit 20 depending on the cache storage operation status to either adjust and produce, or make a new entity.

Figure 3:
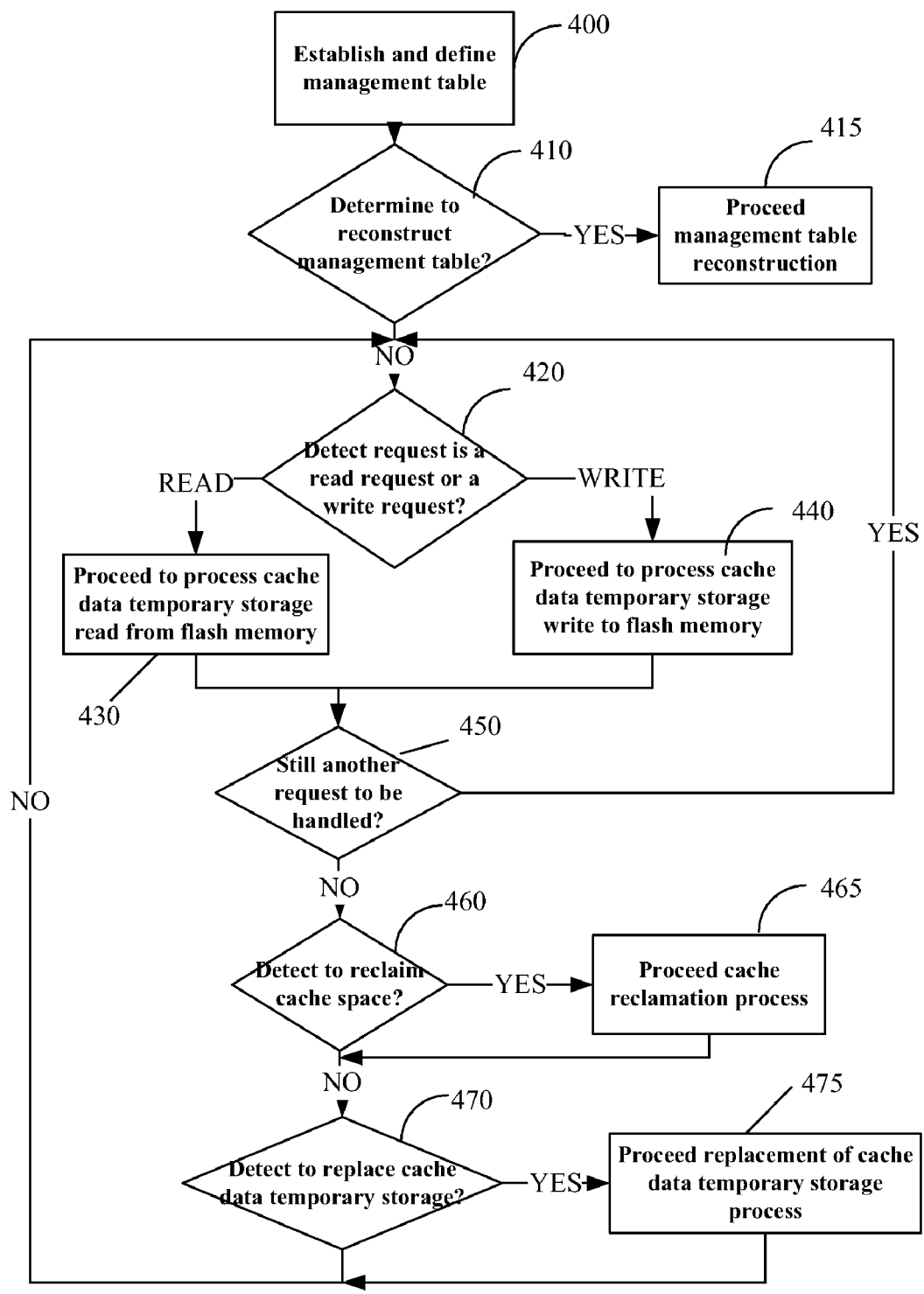
FIG. 3 illustrates a flowchart of the present invention hard disk cache method.

Please refer to FIG. 3, a flow chart showing the present invention hard disk cache method, the method comprises the steps of:

(400) Establish and define a management table, more particularly, establish a cache management table 300 (as shown in FIG. 2). According to the cache management table 300 contents and computing results, determine the relationship between the logical block address in the hard disk 10 and physical block address in the flash memory 30, i.e., determine the physical block address of flash memory 30 to be read/written for cache data.

(410) Determine whether to reconstruct management table? If yes, proceed to step 415; if not, then proceed to step 420, that is to determine whether a problem has occurred in host device 200 hard disk 10 causing to loss cache data due to irregular shutdown or power failure, and therefore, require to reconstruct management table 300.

(415) Proceed to reconstruct management table, that is, calculate physical memory block pages index corresponding to logical memory block address index, and determine if the memory block is a main block 330 or an overflow block 340 (as shown in FIG. 2) in order to reconstruct management table 300. Therefore, resolving the problem of hard disk 10 losing cache data due to irregular shutdown or power failure.

(420) Detect whether the request from the host device 200 is a read request or a write request? If a read request, proceed to step 430; if a write request, then proceed to step 440.

(430) Proceed to read cache data from flash memory. That is, read-out the cache data from the main block 330 or the overflow block 340 of the cache buffer 320 of the storage sector 310 which corresponds to logical block address of hard disk 10 to be read, and sent the aforesaid information back to host device 200. If the required data is currently not reside in the flash memory, read the data from the hard disk 10 and then cache the data in the flash memory.

(440) Proceed to write data into flash memory. That is, temporarily storing written cache data into the main block 330 or overflow block 340 of the cache buffer 320 of the storage sector 310 which corresponds to logical block address of hard disk 10 to be written.

(450) Still another request to be handled? If yes, proceed to step 420; if not, then proceed to step 460.

(460) Detect whether to recycle cache space? If yes, proceed to step 465; if not, then proceed to step 470.

(465) Proceed cache space recycle process. That is, when overflow blocks 340 are filled and new data in the main block 330 are colliding, recycle cache space of main blocks 330 and overflow blocks 340.

(470) Detect whether to replace cache data temporarily stored? If yes, proceed to step 475; if not, then proceed to step 420.

(475) Proceed replacement cache data temporary storage procedure. Replace original cache data temporarily stored in main blocks 330 and overflow blocks 340 of cache buffer 320.

Figure 4:
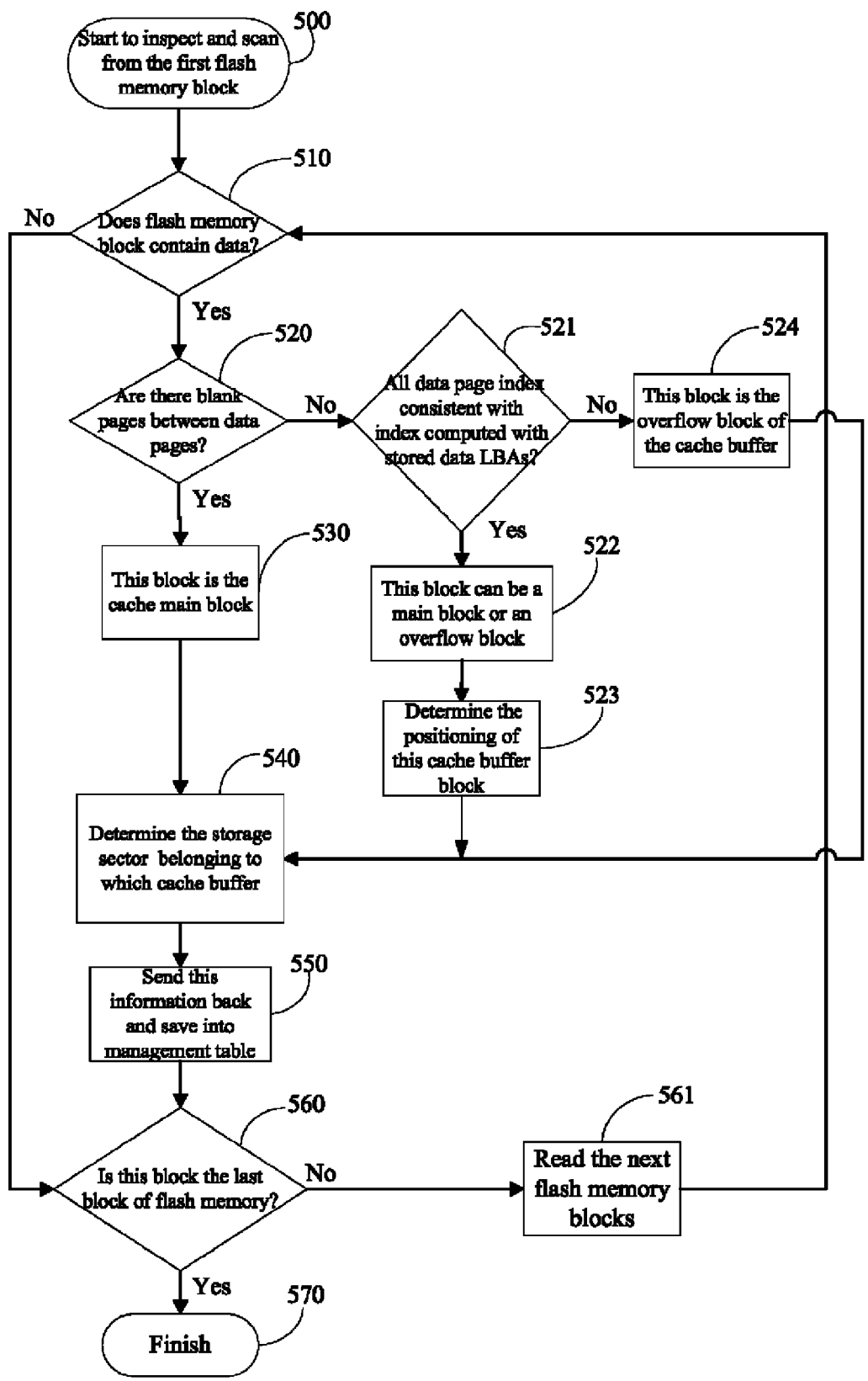
FIG. 4 illustrates a management table reconstruction flow chart of the present invention hard disk cache method.

Please refer to FIG. 4, a flowchart of reconstructing management table in accordance with step 415 of FIG. 3. As previously mentioned, management table 300 losing data as a result of host device 200 irregular shutdown or power failure; therefore, in order to efficiently read/write cache data stored in flash memory 30, the above-mentioned steps provided management table 300 reconstruction mechanism is in place to increase the reliability of the present invention cache method. The basic concept of reconstructing management table 300 is mainly through the different ways that main blocks 330 and overflow blocks 340 of cache buffer 320 place cache data read/write to provide clues and reconstruction index. That is, simply scan all physical memory blocks of flash memory 30 and management table 300 can be reconstructed. The reconstruction steps 500-570, where:

(500) Start to inspect and scan from the first flash memory block. That is, every physical memory block of flash memory 30 is inspected and scanned.

(510) Does flash memory block contain data? If yes, proceed to step 520; if no, then proceed to step 560.

(520) Are there blank pages between data pages? If yes, proceed to step 530; if not, then proceed to step 521.

(521) Are all data page index consistent with index computed with stored data logical block address? If yes, proceed to step 522; if no, proceed to step 524.

(522) This block can be a main block or an overflow block of a cache buffer 320. That is, this physical memory block is set as a main block 330 or an overflow block 340, accordingly, depending on the needs of management table 330.

(523) Depending on which cache buffer block is arriving to determine the positioning of this cache buffer block. That is, from the block status of cache buffer 320, determine whether physical memory block is a main block 330 or an overflow block 340, and proceed to step 540.

(524) This block is the overflow block of the cache buffer, access this block as overflow block 340, and proceed to step 540.

(530) This block is the cache main block, access this physical memory block as main block 330 of management table 300.

(540) According to logical block address corresponding to physical flash-memory page 331 of the main block 330, or physical flash-memory page 331 of overflow block 340, determine the storage sector 310 belonging to which cache buffer 320.

(550) Send this information back and save into management table. That is, send this information of cache buffer 320 from step 540 back and save into management table 300.

(560) Is this block the last block of flash memory? If it is, proceed to step 570; if not, then proceed to step 561. That is, determine if the physical memory block inspected and scanned is the last physical memory block of flash memory 30.

(561) Read the next flash memory blocks. That is, proceed to read, inspect and scan the next physical memory block of flash memory 30; re-execute again from step 510.

(570) Finish

Figure 5:
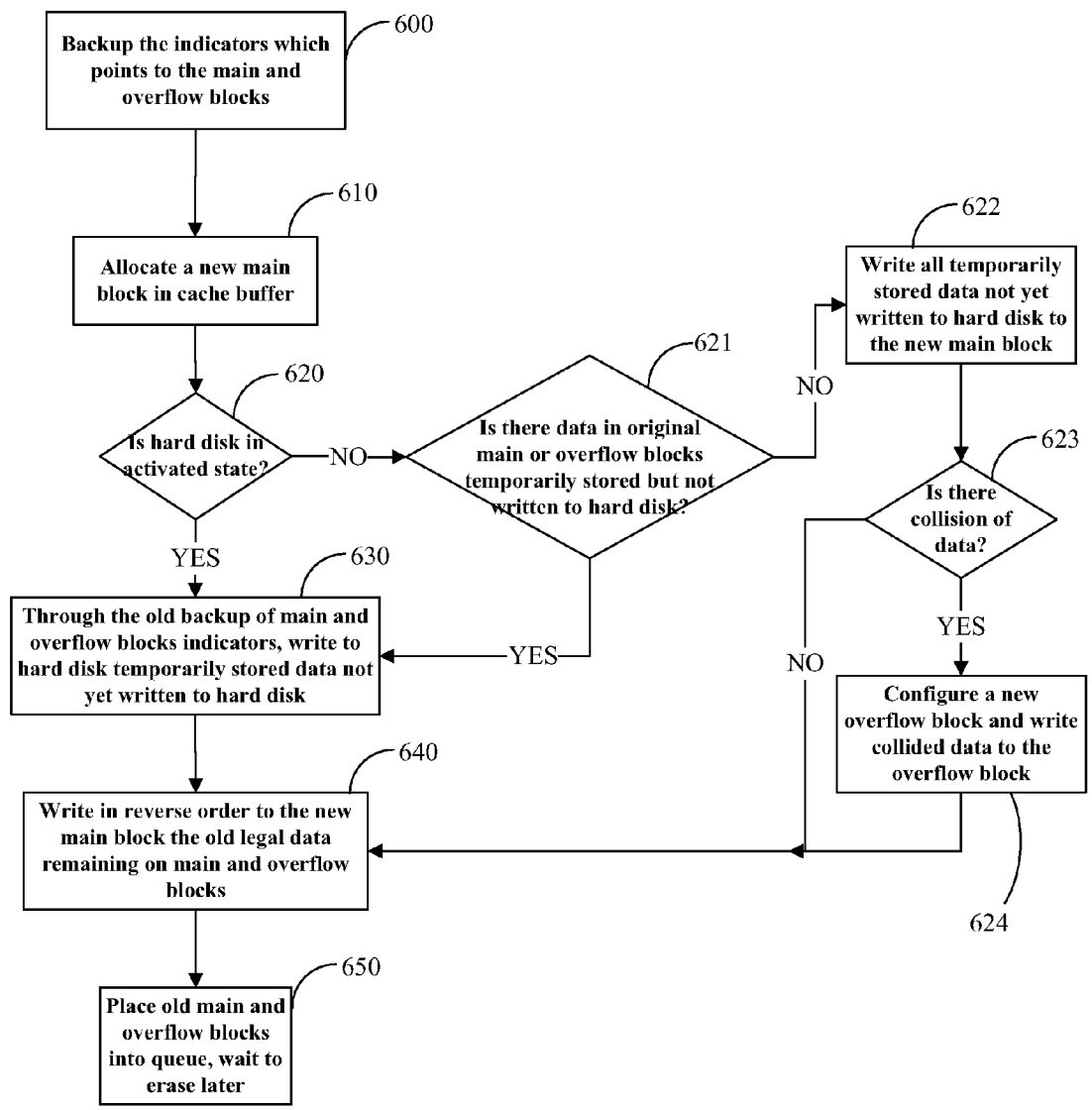
FIG. 5 illustrates space recycle process flow chart of the present invention hard disk cache method.

Please refer to FIG. 5, a cache space recycle procedure in accordance to step 465 of FIG. 3. Due to the fact that flash memory has an out-of-place-update feature (i.e., flash memory cannot overwrite the same page unless the whole block is erased), so the physical flash-memory page 331 in target main block 330 may be previously saved data of the same logical block address. When this situation occurs, newly saved data will be written to the first blank physical flash-memory page 341 of the overflow block 340 in the same manner mentioned previously. When the overflow blocks 340 are filled and new data collide in main blocks 330, recycle process of cache space starts. Recycle process comprises steps 600 to 650, where:

(600) Back-up indicators which points to the main block and the overflow block of the cache buffer. That is, backup the indicators pointing to the main block 330 and the overflow block 340 of the cache buffer 320.

(610) Allocate a new main block for the cache buffer. Allocate a new blank main block 330 for cache buffers 320.

(620) Is hard disk in activated state? If yes, proceed to step 630; if no, then proceed to step 621.

(621) Is there data in the original main or overflow blocks temporarily stored but not yet written to hard disk? If yes, proceed to step 630; if no, then proceed to step 622. That is, determine whether cache data of original main block 330 and overflow block 340 is the data not yet written to hard disk 10.

(622) Write to the new main block all temporarily stored but not yet written to hard disk data. Write hard disk 10 cache data temporarily stored in the main block 330 and the overflow block 340 into the newly configured main block 330.

(623) Is there collision of data? If yes, proceed to step 624; if no, then proceed to step 640. That is, determine if there is data collision in the new main block 330.

(624) Allocate a new overflow block, and write collided data to the overflow block. That is, allocate a new overflow block 340 in the cache buffer 320. In addition, write collided cache data into the new overflow block 340, and proceed to step 640.

(630) Through the original backup of the main block and the overflow block indicators, write to hard disk the temporarily stored data not yet written to hard disk.

(640) Write in reverse order to the new main block the original legal data remaining on the main block and the overflow block, and if conflict occurs, then discard data.

(650) Place the original main block and overflow block into queue, wait to erase later.

Figure 6:
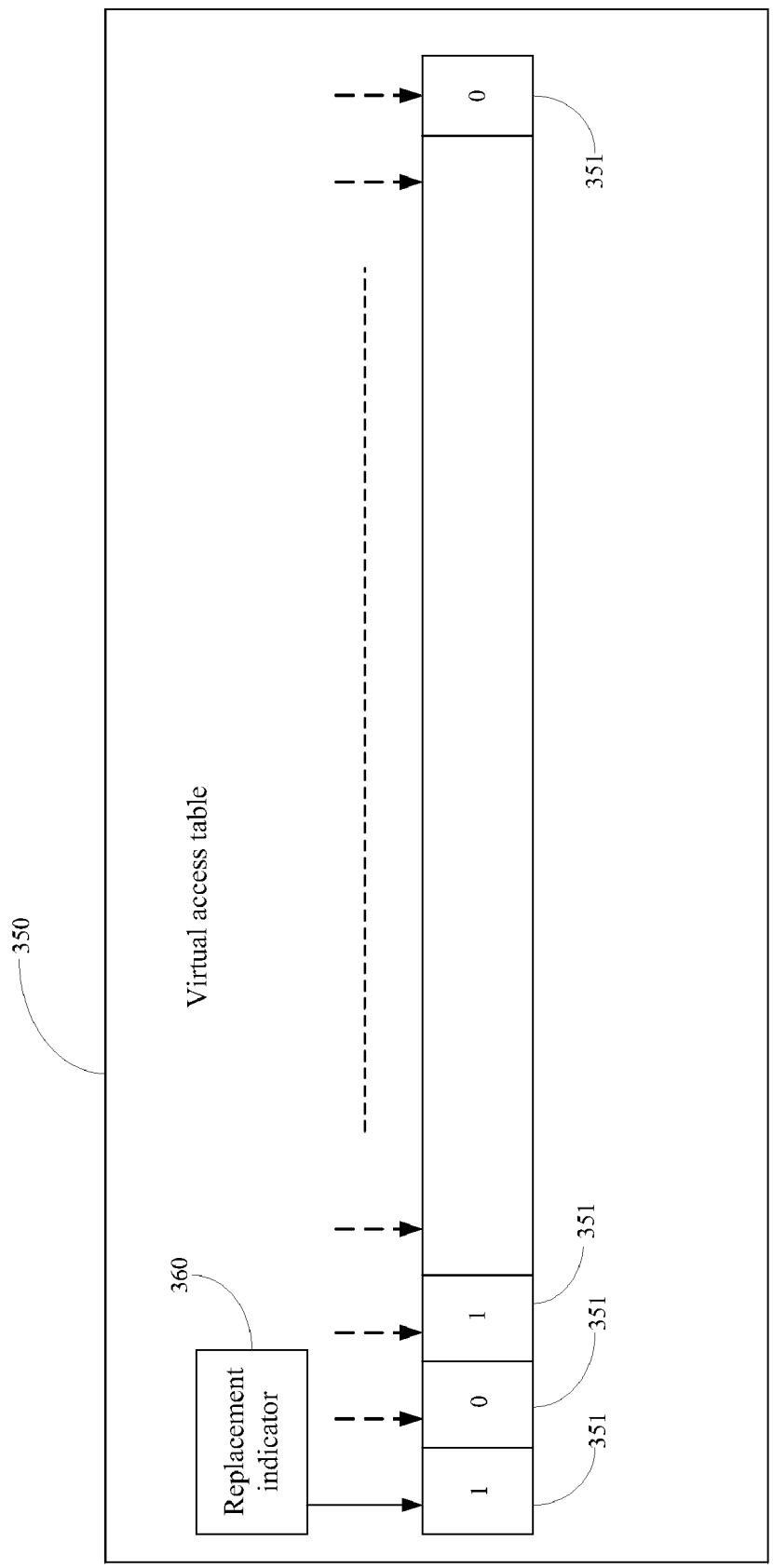
FIG. 6 illustrates the virtual structure of replacement cache buffer data procedure of the present invention hard disk cache method.

Please refer to FIG. 6, a virtual access table structure of replacement procedure of cache buffer data in accordance with step 475 of FIG. 3. Due to flash memory 30 cache space being much smaller than hard disk 10 space, so it is possible that there may not be sufficient space to configure new cache buffers 320. This requires a replacement of original cache buffers 320. Regarding replacement of original cache buffers 320, the present invention considers the following three principles: first, the replacement of cache buffers 320 should not be limited to a particular storage sector's cache buffers 320, and should consider all cache buffers; second, less frequently accessed cache buffers 320 should be replaced. Third, consideration should be given to the flash memory 30 out-of-place-update feature. In accordance with these principles, the present invention flash memory block is as a circular ordered array. When the cache buffers 320 are required to configure flash memory blocks as the main block 330 or overflow block 340, the first blank block is sent in order.

When receiving the next configuration request, it starts from the previously configured block addresses to seek for the next blank block. According to this configuration, the back physical memory blocks are recently accessed. The aforesaid configuration does not provide enough information for deciding to replace which cache buffer 320. Therefore, the present invention provides a virtual access table 350 (FIG. 6). The virtual access table 350 comprises a plurality of bits 351 and a replacement indicator 360. Each bit 351 of virtual access table 350 is corresponding to each flash memory block of flash memory 30. When a cache buffer 320 is accessed, the bits 351 corresponding to its main block 330 and overflow block 340 will be set the value 1. When replacement of cache buffer 320 is needed, there will be an inspection by replacement indicator 360 to seek whether the bit 351 is 0. If the bit 351 is 0, then proceed to replace the corresponding cache buffer. In addition, if the bit 351 corresponding flash memory block is not configured to cache buffer 320, then continue to seek the next bit with value 0. If the replacement indicator points to bit 351 with value of 1, proceed to clear 1 and set as 0; continue to seek the next bit. When the replacement indicator 360 is pointing to the last bit 351 of virtual access table, it will go back to point to the first bit 351 of the virtual access table.

Figure 7:
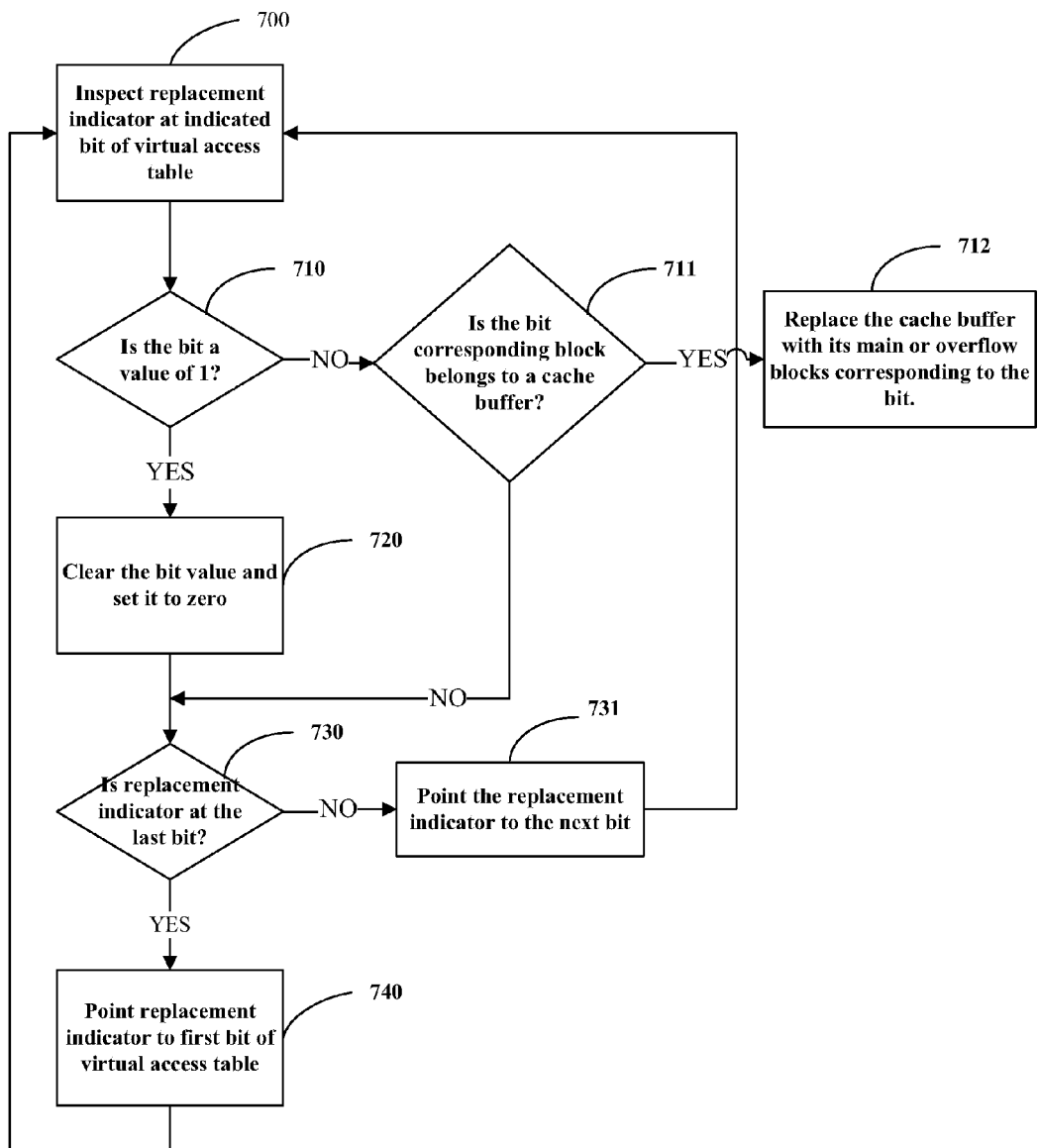
FIG. 7 illustrates the replacement cache buffer data procedure flowchart of the present invention hard disk cache method.

Please refer to FIG. 7, replacement procedure steps of temporarily stored cache data in accordance with step 475 of FIG. 3, comprises steps 700~740, where:

(700) Examine replacement indicator at indicated bit of the virtual access table.

(710) Is the bit a value of 1? If yes, proceed to step 720; if no, then proceed to step 711.

(711) Is the bit corresponding block belongs to a cache buffer 320? If yes, proceed to step 712; if not, then proceed to step 730.

(712) Replace the cache buffer with its main or overflow blocks corresponding to the bit. That is, replace cache buffer 320 with its main or overflow blocks corresponding to bit 351 of virtual access table 350.

(720) Clear the bit and set it to zero.

(730) Is replacement indicator at the last bit? If yes, proceed to step 740; if no, then proceed to step 731. That is, determine whether replacement indicator 360 in step 700 is pointed to virtual access table 350 of the last bit 351.

(731) Point replacement indicator to the next bit. That is, point replacement indicator 360 in step 700 to virtual access table 350 next bit 351, and re-execute again from step 700.

(740) Point the replacement indicator to the first bit of virtual access table.

Figure 8:
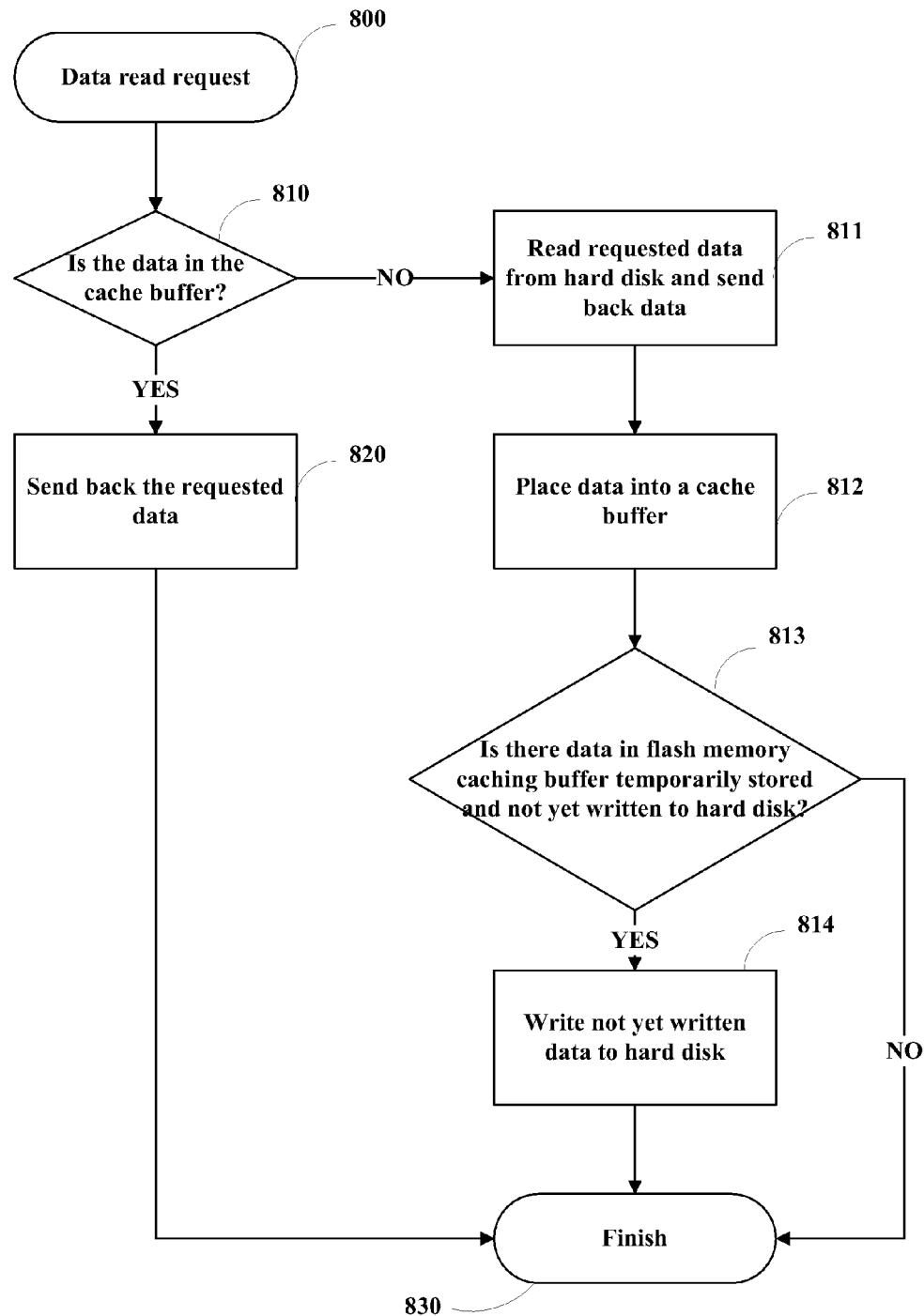
FIG. 8 illustrates flow chart of cache temporary data from flash memory read out of the present invention hard disk cache method.

Please refer to FIG. 8, a cache data read-out procedure flow chart in accordance with step 430 of FIG. 3, comprises steps of 800 to 830, where:

(800) Data read request.

(810) Is the read data in cache buffers of flash memory? If yes, proceed to step 820; if no, then proceed to step 811.

(811) Read requested data from hard disk 10 and transmit data back. That is, read from hard disk 10 data that is requested and transmit back to host device 200.

(812) Place data into a cache buffer of the flash memory. From hard disk 10 in step 811 to read out data and store into the corresponding cache buffer 320.

(813) Is there data temporarily stored and not yet written into hard disk in cache buffers? That is, the unwritten data from step 932 can now be written back to the hard disk. If yes, proceed to step 814; if no, then proceed to step 830.

(814) Write not yet written data to hard disk 10. Since now hard disk 10 is activated from step 811, we could write those data temporarily stored and not yet written into hard disk 10 back into the hard disk 10, then proceed to step 830.

(820) Transmit back the requested data. That is, read-out data temporarily stored in cache buffers 320 and transmit back to host device 200.

(830) Finish.

Figure 9:
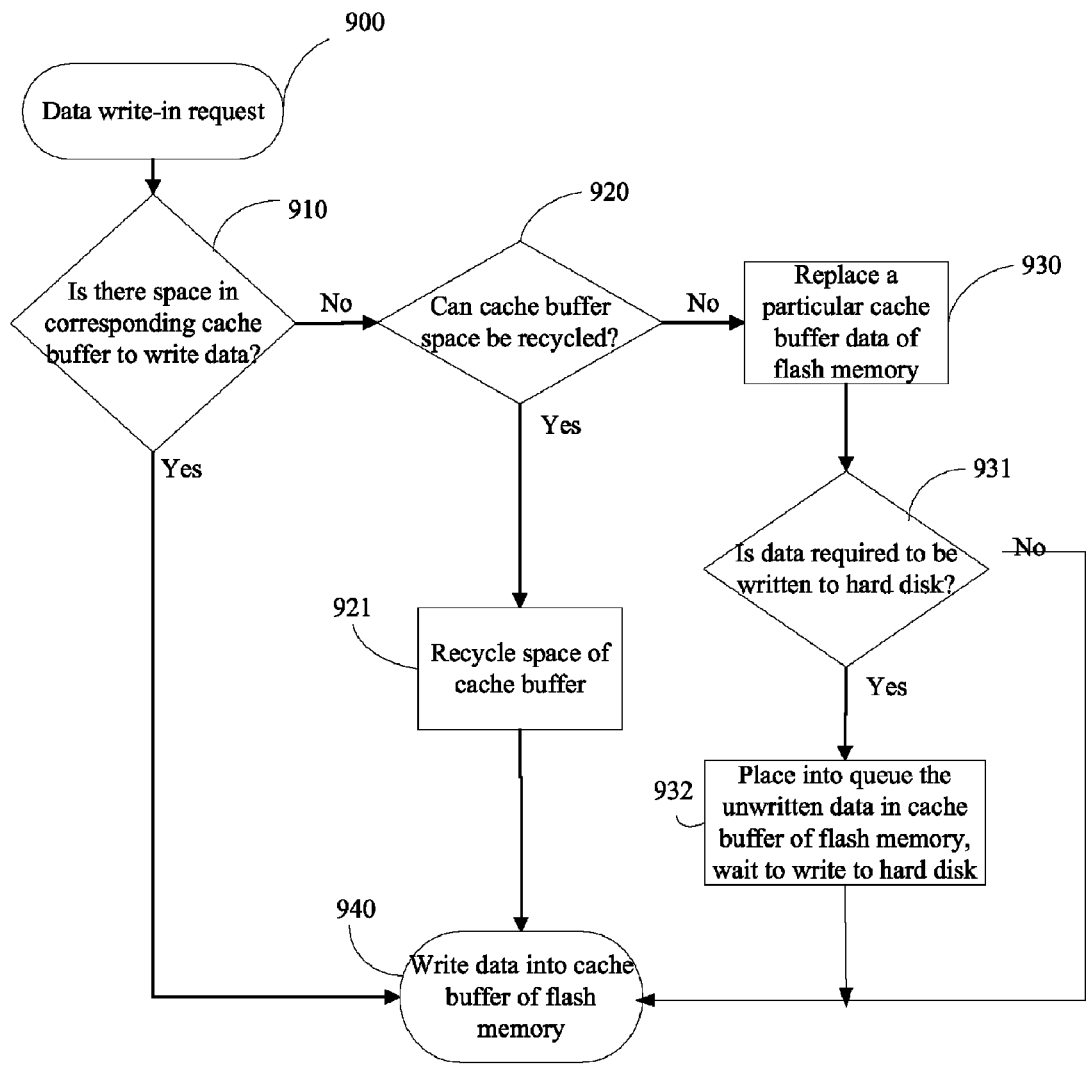
FIG. 9 illustrates flow chart of cache data from flash memory write-in of the present invention hard disk cache method.

Please refer to FIG. 9, a flow chart showing a write-in procedure of cache buffer data to flash memory in accordance with step 440 of FIG. 3, comprises steps 900~940, where:

(900) Data write-in request.

(910) Is there space in the corresponding cache buffer to write data? If yes, proceed to step 940; if no, then proceed to step 920.

(920) Can cache buffer space be recycled? If yes, proceed to step 921; if no, proceed to step 930.

(921) Recycle space of cache buffer. That is, recycle the cache buffer 320 storage space according to cache space recycle procedure shown in FIG. 5, and then proceed to step 940.

(930) Replace a particular cache buffer data of flash memory. That is, according to the replacement procedure of cache data showing in FIG. 7, proceed to replace data within a particular cache buffer 320.

(931) Is data required to be written to the hard disk? If yes, go to step 932; if not, proceed to step 940.

(932) Place into queue the unwritten data in cache buffer of flash memory, wait to write to hard disk.

(940) Write data into cache buffer of flash memory. That is, write cache data into cache buffer 320.

The above-mentioned hard disk cache data read/write device and method described in FIG. 1 to FIG. 9 are according to the present invention. It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of caching access a hard disk, comprising:
   (a) establishing a management table, the management table comprising a plurality of storage sectors, a plurality of cache buffers, a plurality of main blocks and a plurality of overflow blocks, the management table determining a relationship between logical block addresses in a hard disk and physical block addresses in a flash memory;
   (b) determining whether to reconstruct the management table;
   (c) reconstructing the management table by calculating the corresponding logical block address index in flash-memory block pages to determine if the flash memory block is a main block or an overflow block of a certain cache buffer, wherein the step (c) comprises the steps of:
      (c1) inspecting every physical memory block of the flash memory;
      (c2) determining whether the flash memory block contains data;
      (c3) determining whether blank pages are between data pages, wherein the step (c3) further comprises the steps of:
         (c31) determining whether all data page indices are consistent with indices computed with stored data logical block address;
         (c32) setting this physical memory block as a main block or an overflow block depending on the needs of management table;
         (c33) based on the block status of cache buffer, determining whether physical memory block is a main block or an overflow block;
      (c4) according to logical block address corresponding to physical flash-memory page of the main block, or physical flash-memory page of overflow block, determining the storage sector to which the cache buffer belongs; and
      (c5) sending this information into management table;
   (d) detecting whether to recycle cache space;
   (e) recycling cache space when the overflow block is filled and new data in the main block are colliding;
   (f) detecting whether to replace the cache data;
   (g) replacing original cache data temporarily stored in the main block and the overflow block of a cache buffer;
   (h) detecting whether the cache data temporarily stored in the flash memory is read from or write to the flash memory;
   (i) reading the cache data from the main block or overflow block of the cache buffer which corresponds to logical block address of hard disk to be read, and sending the cache data to a host device; and
   (j) temporarily storing the written cache data into the main block or overflow block of the cache buffer which corresponds to logical block address of hard disk to be written.

2. The method of claim 1, wherein the step (e) comprises:
   (e1) backing-up indicators which points to the main block and the overflow block of a cache buffer;
   (e2) allocating a new main block for the cache buffer;
   (e3) determining whether the hard disk is in activated state, wherein the step (e3) further comprises the steps of:
      (e31) determining whether data in the original main block or the overflow block is temporarily stored but not yet written to hard disk;
      (e32) writing to the new main block all temporarily stored but not yet written to hard disk data;
      (e33) determining whether collision of data is in the new main block; and
      (e34) allocating a new overflow block, and writing collided data to the overflow block;
   (e4) through the original backup of the main block and the overflow block indicators, writing to hard disk the temporarily stored not yet written to hard disk data;
   (e5) writing in reverse order to the new main block the original legal data remaining on the original main and overflow blocks, and if conflict occurs, discarding data; and
   (e6) placing the original main and overflow blocks into queue waiting for an erasure.

3. The method of claim 1, wherein the step (g) comprises:
   (g1) examining a replacement indicator at indicated bit of a virtual access table;
   (g2) determining whether the bit is a value of 1, wherein the step (g2) further comprises the step of:
      (g21) replacing cache buffer corresponding to the bit of the virtual access table;
   (g3) clearing the bit and setting the bit to zero;
   (g4) determining whether the replacement indicator is at the last bit, wherein the step (g4) further comprises the step of:
      (g41) pointing the replacement indicator to the next bit; and
   (g5) pointing the replacement indicator to the first bit of virtual access table.

4. The method of claim 3, wherein the replacement indicator points to each bit within the virtual access table.

5. The method of claim 1, wherein the step (i) comprises:
   (i1) receiving a data read request;
   (i2) determining whether the read data is in the cache buffers of the flash memory, wherein the step (i2) further comprises the steps of:
      (i21) reading from the hard disk the data that is requested, and transmitting back to the host device;
      (i22) reading the data and storing the data read from the hard disk to a cache buffer;
      (i23) determining whether the data temporarily stored and not yet written into the hard disk is in the cache buffers;
      (i24) putting in queue the temporarily stored and not yet written into the hard disk data in the cache buffers, and then writing to the hard disk; and
   (i3) transmitting back the requested data.

6. The method of claim 1, wherein the step (j) comprises:
   (j1) receiving a data write-in request;
   (j2) determining whether any space is available in the cache buffer to write data;
   (j3) determining whether the space of the cache buffer can be recycled, wherein the step (j3) further comprises the step of:
      (j31) recycling the space of the cache buffer;
   (j4) replacing a cache buffer of the flash memory, wherein the step (j4) further comprises the steps of:
      (j41) determining whether the data required to be written to the hard disk;
      (j42) placing into queue the unwritten data in the cache buffer of the flash memory, and writing to the hard disk; and
   (j5) writing data into the cache buffer of the flash memory.

* * * * *